(12) United States Patent
Meng et al.

(10) Patent No.: US 11,269,225 B2
(45) Date of Patent: Mar. 8, 2022

(54) DISPLAY APPARATUS AND CONTROL METHOD THEREOF, AND DISPLAY DEVICE

(71) Applicant: BOE Technology Group Co., Ltd., Beijing (CN)

(72) Inventors: Xiandong Meng, Beijing (CN); Wei Wang, Beijing (CN); Zhongxiao Li, Beijing (CN); Xiaochuan Chen, Beijing (CN); Xianqin Meng, Beijing (CN); Jifeng Tan, Beijing (CN); Jian Gao, Beijing (CN); Fangzhou Wang, Beijing (CN)

(73) Assignee: BOE Technology Group Co., LTD., Beijing (CN)

( * ) Notice: Subject to any disclaimer, the term of this patent is extended or adjusted under 35 U.S.C. 154(b) by 0 days.

(21) Appl. No.: 16/641,703

(22) PCT Filed: Jul. 2, 2019

(86) PCT No.: PCT/CN2019/094343
§ 371 (c)(1),
(2) Date: Feb. 25, 2020

(87) PCT Pub. No.: WO2020/007281
PCT Pub. Date: Jan. 9, 2020

(65) Prior Publication Data
US 2020/0233271 A1 Jul. 23, 2020

(30) Foreign Application Priority Data
Jul. 6, 2018 (CN) .......................... 201810737237.6

(51) Int. Cl.
*G02F 1/1343* (2006.01)
*F21V 8/00* (2006.01)
*G02F 1/1335* (2006.01)

(52) U.S. Cl.
CPC ...... *G02F 1/134309* (2013.01); *G02B 6/0066* (2013.01); *G02F 1/133514* (2013.01); *G02F 1/134345* (2021.01)

(58) Field of Classification Search
None
See application file for complete search history.

(56) References Cited

U.S. PATENT DOCUMENTS 6,999,156 B2    2/2006   Chou et al.
2017/0102487 A1*   4/2017   Lee .................... G03F 7/2053
(Continued)

FOREIGN PATENT DOCUMENTS

CN    203433236 U    2/2014
CN    104020896 A    9/2014
(Continued)

OTHER PUBLICATIONS

Espacenet English machine translation of CN206096710U (Year: 2017).*

(Continued)

*Primary Examiner* — Edward J Glick
*Assistant Examiner* — David Y Chung
(74) *Attorney, Agent, or Firm* — Fay Sharpe LLP

(57) ABSTRACT

Disclosed are a display apparatus and a control method thereof. The display apparatus includes a light-transmitting substrate, a backlight source, a liquid crystal layer and a grate-like structure. The liquid crystal layer is disposed between the light-transmitting substrate and the backlight source. The grate-like structure is disposed on a side of the light-transmitting substrate proximal to the liquid crystal layer. The grate-like structure is reused as both an electrode configured to control an equivalent refractive index of the liquid crystal layer and a grating. The backlight source includes a light guide plate and a collimated light source (Continued)

which is disposed on a side of the light guide plate. The grate-like structure is disposed on a side of the liquid crystal layer distal from the light guide plate and reused as both an electrode configured to control the refractive index of the liquid crystal and a grating.

17 Claims, 9 Drawing Sheets

(56) References Cited

U.S. PATENT DOCUMENTS

| | | | |
|---|---|---|---|
| 2018/0149917 A1 | 5/2018 | Wang et al. | |
| 2018/0299737 A1* | 10/2018 | Shimoshikiryoh | G02F 1/13454 |
| 2018/0329220 A1* | 11/2018 | Ma | G02B 30/27 |
| 2018/0364505 A1 | 12/2018 | Tan et al. | |
| 2019/0025644 A1 | 1/2019 | Tan et al. | |
| 2019/0033507 A1 | 1/2019 | Wang et al. | |
| 2019/0204691 A1 | 7/2019 | Tan et al. | |

FOREIGN PATENT DOCUMENTS

| | | | | |
|---|---|---|---|---|
| CN | 105446001 A | | 3/2016 | |
| CN | 106154657 A | * | 11/2016 | ............ G02B 30/27 |
| CN | 106324897 A | | 1/2017 | |
| CN | 106444177 A | | 2/2017 | |
| CN | 206096710 U | * | 4/2017 | |
| CN | 206096710 U | | 4/2017 | |
| CN | 107918233 A | | 4/2018 | |
| CN | 108051961 A | | 5/2018 | |
| CN | 108957830 A | | 12/2018 | |
| EP | 1324110 B1 | | 6/2010 | |

OTHER PUBLICATIONS

Espacenet English machine translation of CN106154657A (Year: 2016).*
First office action of Chinese application No. 201810737237.6 dated Feb. 25, 2020.
International Search Report from PCT/CN2019/094343 dated Sep. 23, 2019.

* cited by examiner

DISPLAY APPARATUS AND CONTROL METHOD THEREOF, AND DISPLAY DEVICE

This application is a 371 of PCT Application No. PCT/CN2019/094343, filed Jul. 2, 2019, which claims priority to Chinese Patent Application No. 201810737237.6, filed Jul. 6, 2018 and entitled "DISPLAY APPARATUS AND CONTROL METHOD THEREOF, AND DISPLAY DEVICE", the entire contents of which are incorporated herein by reference.

TECHNICAL FIELD

The present disclosure relates to the field of display technologies, and more particularly to a display apparatus and a control method thereof, and a display device.

BACKGROUND

Display apparatuses are apparatuses having a display function, which are widely used in various devices.

A display apparatus includes a light-transmitting substrate, an edge-type backlight source, and a liquid crystal layer disposed between the light-transmitting substrate and the edge-type backlight source. Two electrode assemblies are arranged one on each side of the liquid crystal layer; and a grating is further arranged between the liquid crystal layer and the edge-type backlight source. The two electrode assemblies are configured to control a refractive index of the liquid crystal layer such that light from the edge-type backlight source may be emitted into the liquid crystal layer, and the grating is configured to adjust an angle of the light emitted into the liquid crystal layer such that the light may be emitted out of the display apparatus through the light-transmitting substrate.

SUMMARY

Embodiments of the present disclosure provide a display apparatus and a control method thereof, and a display device. The technical solutions are as follows:

According to one aspect of the present disclosure, a display apparatus is provided. The display apparatus includes a light-transmitting substrate, a backlight source, a liquid crystal layer, and a grate-like structure; wherein, the liquid crystal layer is disposed between the light-transmitting substrate and the backlight source, and the grate-like structure is disposed on a side of the light-transmitting substrate proximal to the liquid crystal layer, and the grate-like structure is reused as a grating and an electrodes configured to control an equivalent refractive index of the liquid crystal layer; and, the backlight source includes a light guide plate and a collimated light source which is disposed on a side of the light guide plate other than two larger surfaces thereof.

Optionally, the display apparatus includes a plurality of sub-pixel regions arranged in an array;
wherein the grate-like structure includes a plurality of grate-like electrodes, and each of the sub-pixel includes has at least two grate-like electrodes.

Optionally, the display apparatus includes a plurality of sub-pixel regions arranged in an array;
wherein the display apparatus includes an electrode assembly, and the electrode assembly includes a first electrode structure disposed on a side of the liquid crystal layer proximal to the backlight source.

Optionally, the first electrode structure includes a plurality of first electrodes;
wherein the plurality of first electrodes are respectively disposed in each of the sub-pixel regions, and the grate-like structure covers on a side of the liquid crystal layer distal from the backlight source, and the grate-like structure is an integral structure.

Optionally, the grate-like structure includes a plurality of grate-like electrodes;
wherein the plurality of grate-like electrodes are respectively disposed in each of the sub-pixel regions, and the first electrode structure is an electrode layer which covers the side of the liquid crystal layer proximal to the backlight source.

Optionally, the grate-like structure includes a plurality of grate-like electrodes;
wherein the plurality of grate-like electrodes are respectively disposed in each of the sub-pixel regions, and the first electrode structure includes a plurality of first electrodes, the plurality of first electrodes being respectively disposed in each of the sub-pixel regions respectively.

Optionally, the display apparatus includes a plurality of sub-pixel regions arranged in an array;
the display apparatus includes an electrode assembly, wherein the electrode assembly includes a second electrode structure disposed between the light-transmitting substrate and the grate-like structure; and the grate-like structure includes a plurality of grate-like electrodes, the plurality of grate-like electrodes being respectively disposed in each of the sub-pixel regions, and the second electrode structure and the grate-like structure are insulated from each other.

Optionally, a material of the grate-like structure includes a reflective and conductive material.

Optionally, the display apparatus includes a color filter substrate, wherein the color filter substrate is disposed between the light-transmitting substrate and the grate-like structure.

Optionally, the light-transmitting substrate is a color filter substrate, wherein the color filter substrate includes a transparent base substrate and a color filter layer which is disposed on a side of the transparent base substrate proximal to the liquid crystal layer.

Optionally, the color filter substrate is a quantum dot color filter substrate.

Optionally, the grate-like structure satisfies a diffraction grating formula:

$$n_i \sin \theta_i - n_d \sin \theta_d = m*\lambda/\Lambda (m=0,+/-1,+/-2,\ldots)$$

wherein $n_i$ is an incident spatial refractive index, $n_d$ is an emitting spatial refractive index, $\theta_i$ is an incident angle, $\theta_d$ is an emitting angle, m is a grating order, $\lambda$ is a light wavelength, and $\Lambda$ is a grating period of the grate-like structure.

Optionally, the display apparatus includes a plurality of sub-pixel regions arranged in an array;
the display apparatus includes a second electrode structure disposed between the light-transmitting substrate and the grate-like structure; and the grate-like structure includes a plurality of grate-like electrodes, the plurality of grate-like electrodes being respectively disposed in each of the sub-pixel regions, and the second electrode structure and the grate-like structure are insulated from each other;
a material of the grate-like structure includes a reflective and conductive material;
the light-transmitting substrate is a color filter substrate, wherein the color filter substrate including a transparent base substrate and a color filter layer which is disposed on a side of the transparent base substrate proximal to the liquid crystal layer, wherein the color filter substrate is a quantum dot color filter substrate; and the grate-like structure satisfies a diffraction grating formula:

$$n_i \sin \theta_i - n_d \sin \theta_d = m^* \lambda / \Lambda (m=0,+/-1,+/-2, \ldots)$$

wherein $n_i$ is an incident spatial refractive index, $n_d$ is an emitting spatial refractive index, $\theta_i$ is an incident angle, $\theta_d$ is an emitting angle, m is a grating order, $\lambda$ is a light wavelength, and $\Lambda$ is a grating period of the grate-like structure.

According to another aspect of the present disclosure, a control method of a display apparatus is provided. The control method is applied to the display apparatus according to the above aspect. The method includes:

acquiring a control instruction, wherein the control instruction is configured to instruct a designated display area for light control in a display area of the display apparatus:

upon activation of a collimated light source is activated, changing an equivalent refractive index of a liquid crystal layer of the designated display area by a grate-like structure, such that light from the collimated light source is emitted from an orthographic projection area of the designated display area in the light guide plate into the liquid crystal layer.

Optionally, the display apparatus includes an electrode assembly, and upon the activation of the collimated light source, changing the equivalent refractive index of the liquid crystal layer of the designated display area by the grate-like structure, such that the light from the collimated light source is emitted from the orthographic projection area of the designated display area in the light guide plate into the liquid crystal layer includes:

controlling a deflection angle of liquid crystal in the liquid crystal layer by the grate-like structure or by the grate-like structure and the electrode assembly to adjust a light emitting efficiency of the display apparatus.

Optionally, the display apparatus includes an electrode assembly, and upon acquiring the control instruction, the method further includes:

controlling a deflection long axis of the liquid crystal in the liquid crystal layer of the display area of the display apparatus other than the designated display area by the grate-like structure or by the grate-like structure and the electrode assembly, such that an angle defined between the deflection long axis and the light guide plate is equal to an incident angle of the light in the light guide plate.

According to still another aspect of the present disclosure, a display device is provided. The display device includes the display apparatus according to the above aspect.

Optionally, the display device is a virtual reality device or an augmented reality device.

BRIEF DESCRIPTION OF THE DRAWINGS

For clearer descriptions of the technical solutions in the embodiments of the present disclosure, the accompanying drawings required for describing the embodiments are briefly introduced hereinafter. Apparently, the accompanying drawings in the following description show merely some exemplary embodiments of the present disclosure, and persons of ordinary skill in the art may also derive other drawings from these accompanying drawings without creative efforts.

Specific embodiments of the present disclosure have been illustrated by the accompanying drawings, and detailed descriptions may be given hereinafter. These drawings and textual descriptions are not intended to limit the scope of the concept of the present disclosure, but to illustrate the concept of the present disclosure for a person skilled in the art by reference to the specific embodiments.

DETAILED DESCRIPTION

The embodiments of the present disclosure are described hereinafter with reference to the drawings.

Figure 1:
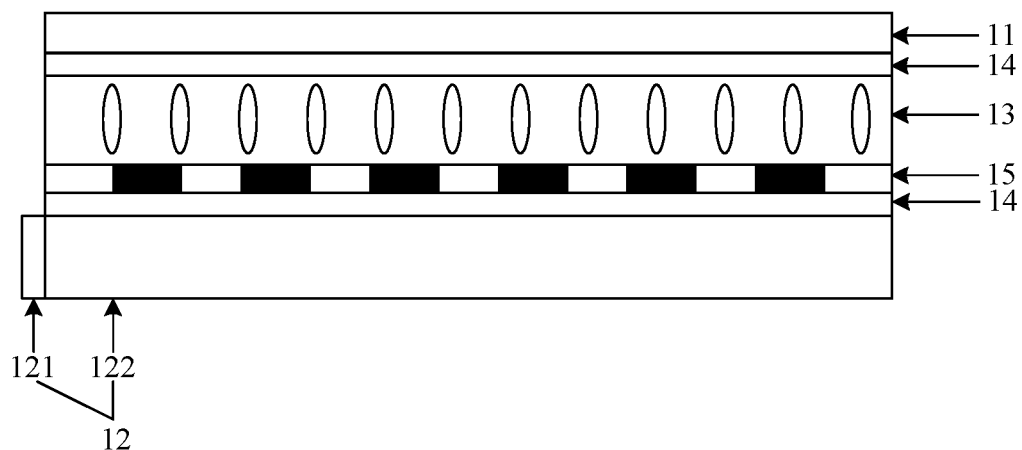
FIG. 1 is a schematic structural diagram of a display apparatus.

A structure of a display apparatus may be as shown in FIG. 1. The display apparatus may include a light-transmitting substrate 11, an edge-type backlight source 12, and a liquid crystal layer 13 disposed therebetween. Two electrode assemblies 14 are arranged on each side of the liquid crystal layer 13; and a grating 15 is further arranged between the liquid crystal layer 13 and the edge-type backlight source 12. The edge-type backlight source 12 may include a light source 121 and a light guide plate 122, and light emitted from the light source 121 may be totally reflected over the light guide plate 122.

The electrode assemblies 14 are configured to control a refractive index of the liquid crystal layer 13 such that the light from the edge-type backlight source 12 is emitted into the liquid crystal layer 13, and the grating 15 is configured to adjust an angle of the light emitted into the liquid crystal layer 13 such that the light is emitted from the display apparatus through the light-transmitting substrate 11.

However, the structure of the display apparatus is relatively complicated, and the grating provided in the display apparatus and the electrode assemblies disposed on each side of the liquid crystal layer make the thickness of the display apparatus great. Moreover, the grating arranged on a side of the liquid crystal layer proximal to the light guide plate is too proximal to the light guide plate, which may cause dark state light leakage of the display apparatus.

Embodiments of the present disclosure provide a display apparatus and a control method thereof, and a display device, which may solve the above problems.

Figure 2:
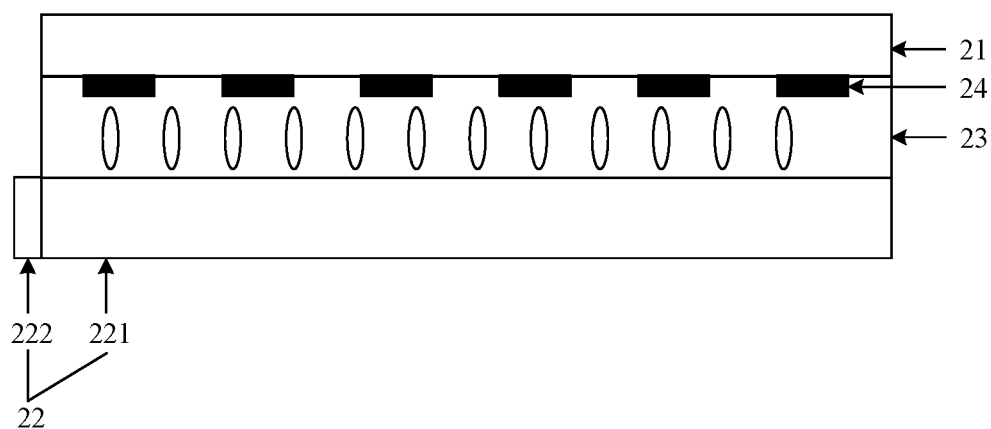
FIG. 2 is a schematic structural diagram of a display apparatus according to an embodiment of the present disclosure.

FIG. 2 is a schematic structural diagram of a display apparatus according to an embodiment of the present disclosure. The display apparatus 20 may include a light-transmitting substrate 21, a backlight source 22, a liquid crystal layer 23, and a grate-like structure 24.

The liquid crystal layer 23 is disposed between the light-transmitting substrate 21 and the backlight source 22. The grate-like structure 24 is disposed on a side of the light-transmitting substrate 21 proximal to the liquid crystal layer 23. The grate-like structure 24 is reused as both a grating, and an electrode configured to control an equivalent refractive index of the liquid crystal layer 23.

The backlight source 22 includes a light guide plate 221 and a collimated light source 222 which is disposed on a side of the light guide plate 221 other than two larger sides (the light guide plate may be a three-dimensional structure surrounded by a top surface, a bottom surface (the top surface and the bottom surface are the two larger surfaces), and a side which is a light-incident surface of the light guide plate).

Since the equivalent refractive index of the liquid crystal changes with changes in the voltage applied onto the liquid crystal, the grate-like structure 24 may be configured to change the equivalent refractive index of the liquid crystal layer of the designated display area in the display panel by changing the voltage applied onto the liquid crystal layer, thereby destroying the total reflection conditions of the light in the light guide plate 221, such that the light from the collimated light source 222 is emitted from an orthographic projection area of the designated display area in the light guide plate 221 into the liquid crystal layer 23, and then the light may be irradiated onto the grating 24 to be diffracted and be emitted from the light-transmitting substrate.

In summary, with respect to the display apparatus according to the embodiment of the present disclosure, the grate-like structure is provided on the side of the liquid crystal layer away from the light guide plate, and the grate-like structure is reused as both an electrode for controlling the refractive index of the liquid crystal and a grating, without separately providing electrode assemblies and a grating in the display apparatus. The problems that the structure of the display apparatus is relatively complicated, and the light leakage occurs in the dark state are solved. The effects of simplifying the overall structure of the display apparatus and avoiding the light leakage in the dark state are achieved.

The display apparatus according to the embodiment of the present disclosure may control the refractive index of the liquid crystal layer in various ways, which is detailed hereinafter.

Figure 3:
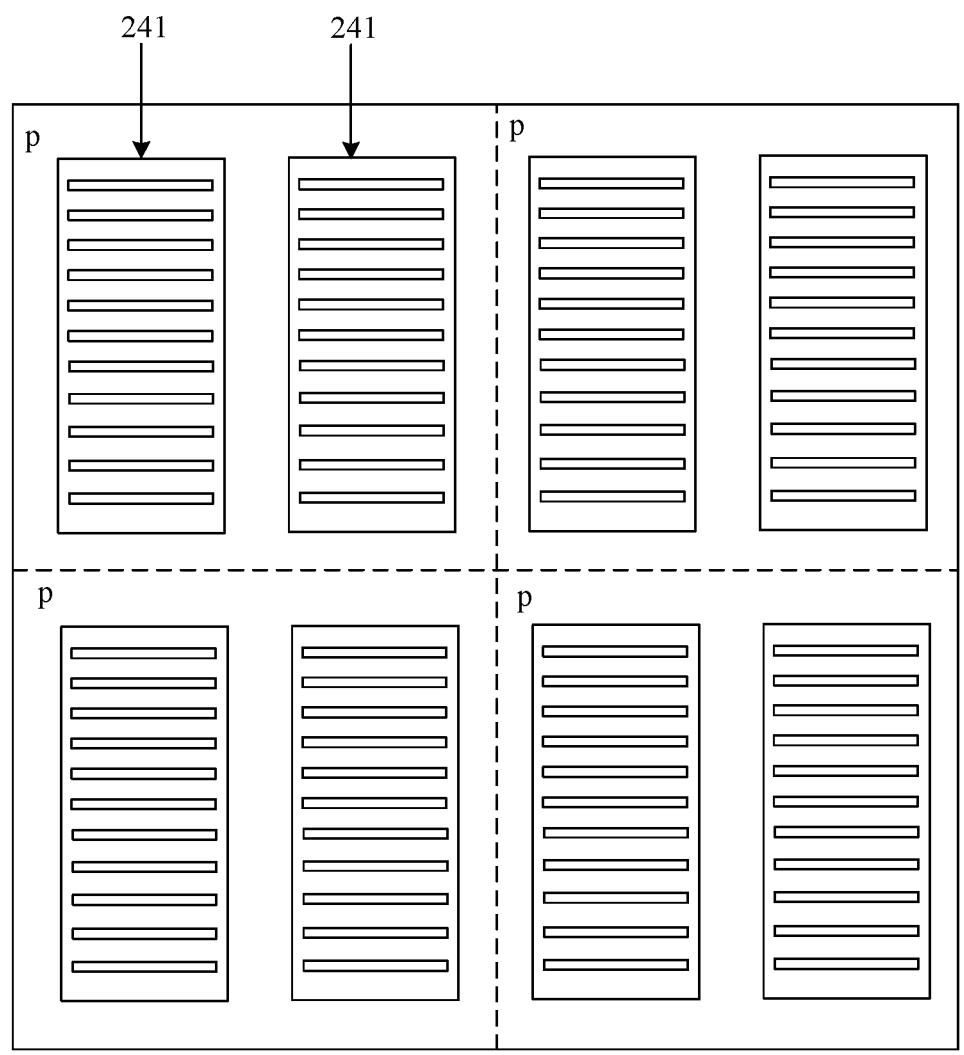
FIG. 3 is a schematic structural diagram of another display apparatus according to an embodiment of the present disclosure.

In an alternative implementation, the refractive index of the liquid crystal layer may be controlled by a grate-like structure. As shown in FIG. 3, the display apparatus 20 may include a plurality of sub-pixel regions p arranged in an array, and the grate-like structure includes a plurality of grate-like electrodes 241 arranged in an array.

Each of the sub-pixel regions p has at least two grate-like electrodes 241 (FIG. 3 illustrates a case where each of the sub-pixel regions includes two grate-like electrodes, but the number of the grate-like electrodes in each of the sub-pixel regions may be more), each of the grate-like electrodes 241 has an integrated structure, so as to ensure that the voltage across any of the grate-like electrodes 241 is equal. With such a structure, when the two grate-like electrodes in each of the sub-pixel regions p have a voltage difference, an arch-shaped electric field may be formed between the two grate-like electrodes, and the equivalent refractive index of the liquid crystal layer is controlled by the arch-shaped electric field. The grate-like electrode may be an electrode block formed with a grating pattern.

Figure 4:
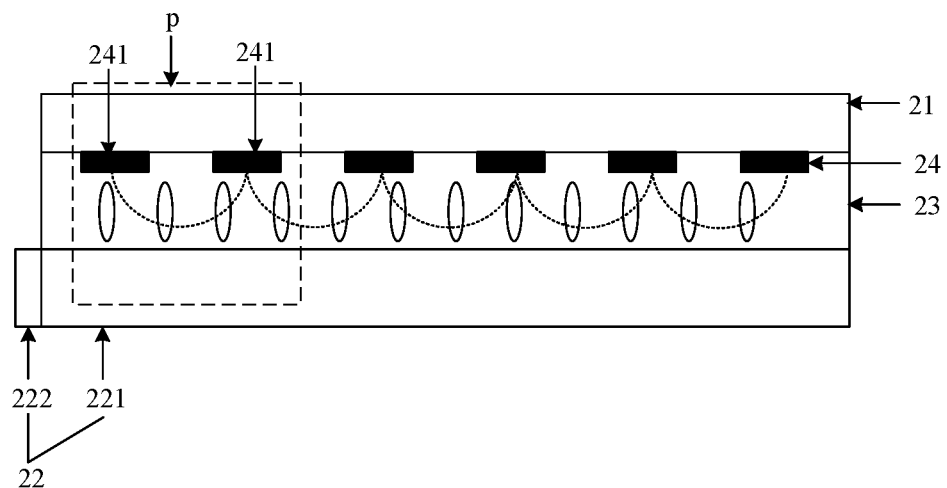
FIG. 4 is a side view of the display apparatus shown in FIG. 3.

FIG. 4 is a side view of the display apparatus shown in FIG. 3. When the two grate-like electrodes 241 in the sub-pixel region p have a voltage difference, an arch-shaped electric field may be formed between the two grate-like electrodes 241, and the refractive index of the liquid crystal layer 23 is controlled by the arch-shaped electric field.

Figure 5:
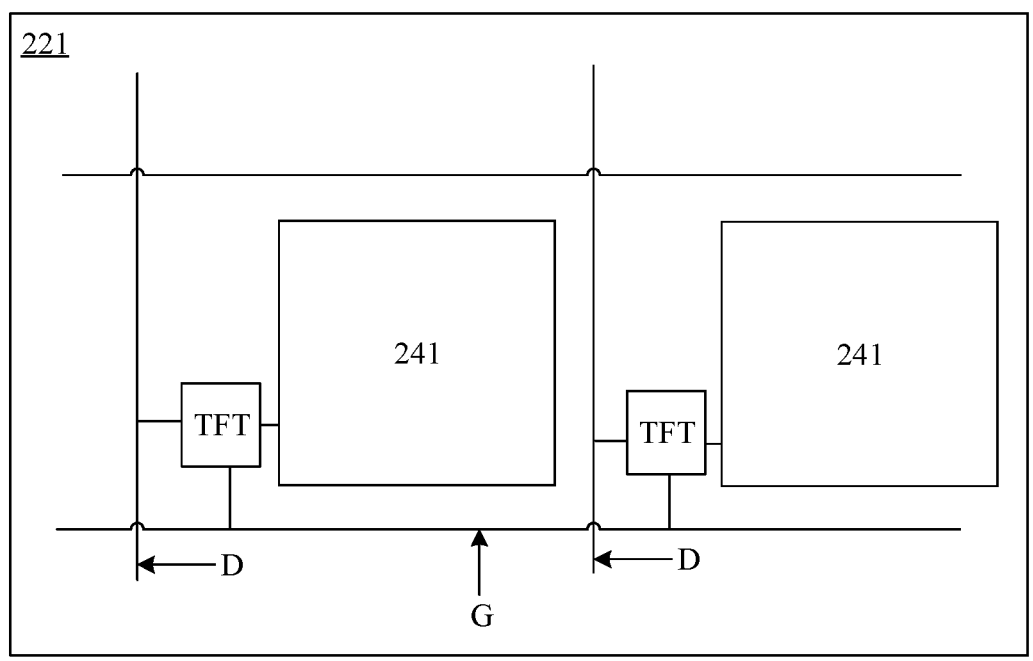
FIG. 5 is a schematic structural diagram of another display apparatus according to an embodiment of the present disclosure.

In the embodiment of the present disclosure, the grate-like electrode in the grate-like structure may be controlled in an active driving manner or a passive driving manner. When the grate-like structure is controlled in an active driving manner, as shown in FIG. 5, the display apparatus may further include a thin film transistor array including a plurality of thin film transistors (TFTs) and gate lines G and data lines D which are arranged to cross each other. The gate lines G and the data lines D are used to control the TFTs, and the TFTs in each of the sub-pixel regions may control the grate-like electrode 241 in each of the sub-pixel regions correspondingly.

Optionally, the material of the grate-like electrode 241 may include various conductive materials, such as a transparent conductive material (such as indium tin oxide), a metal (such as aluminum), and an alloy.

In another alternative implementation, the refractive index of the liquid crystal layer may be controlled jointly by a grate-like structure and an electrode structure which is disposed on the different side of the liquid crystal layer from the grate-like structure.

Figure 6:
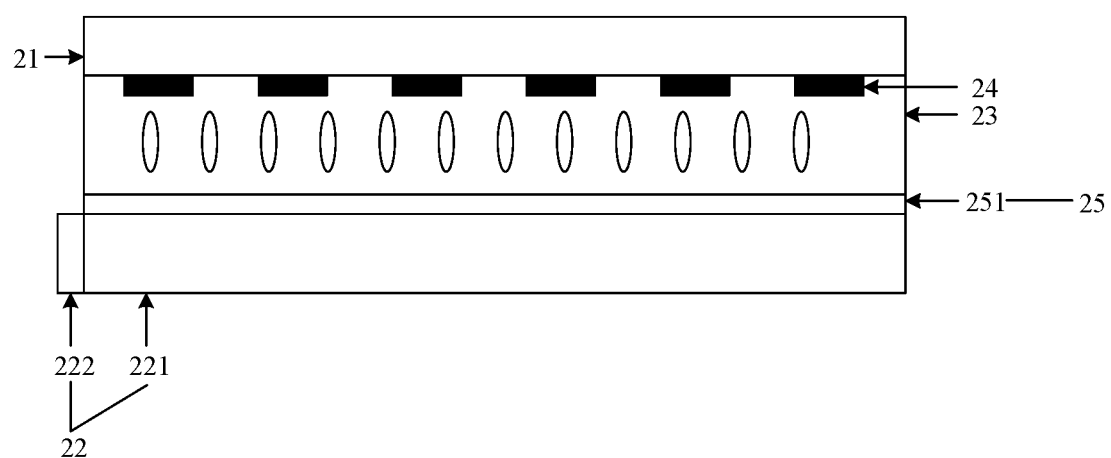
FIG. 6 is a schematic structural diagram of another display apparatus according to an embodiment of the present disclosure.

As shown in FIG. 6, the display apparatus further includes an electrode assembly 25. The electrode assembly 25 includes a first electrode structure 251 disposed on the side of the liquid crystal layer 23 close to the backlight source 22.

The first electrode structure 251 includes a first electrode disposed in each of the sub-pixel regions, and/or, the grate-like structure 24 includes a grate-like electrode disposed in each of the sub-pixel regions.

FIG. 6 illustrates a case where the grate-like structure 24 includes a grate-like electrode disposed in each of the sub-pixel regions and the first electrode structure 251 is an electrode layer. However, it is also possible that the grate-like structure 24 is an electrode layer and the first electrode structure 251 includes a first electrode disposed in each of the sub-pixel regions, and or, the first electrode structure 251 includes a first electrode disposed in each of the sub-pixel regions and the grate-like structure 24 also includes a grate-like electrode disposed in each of the sub-pixel regions.

Figure 7:
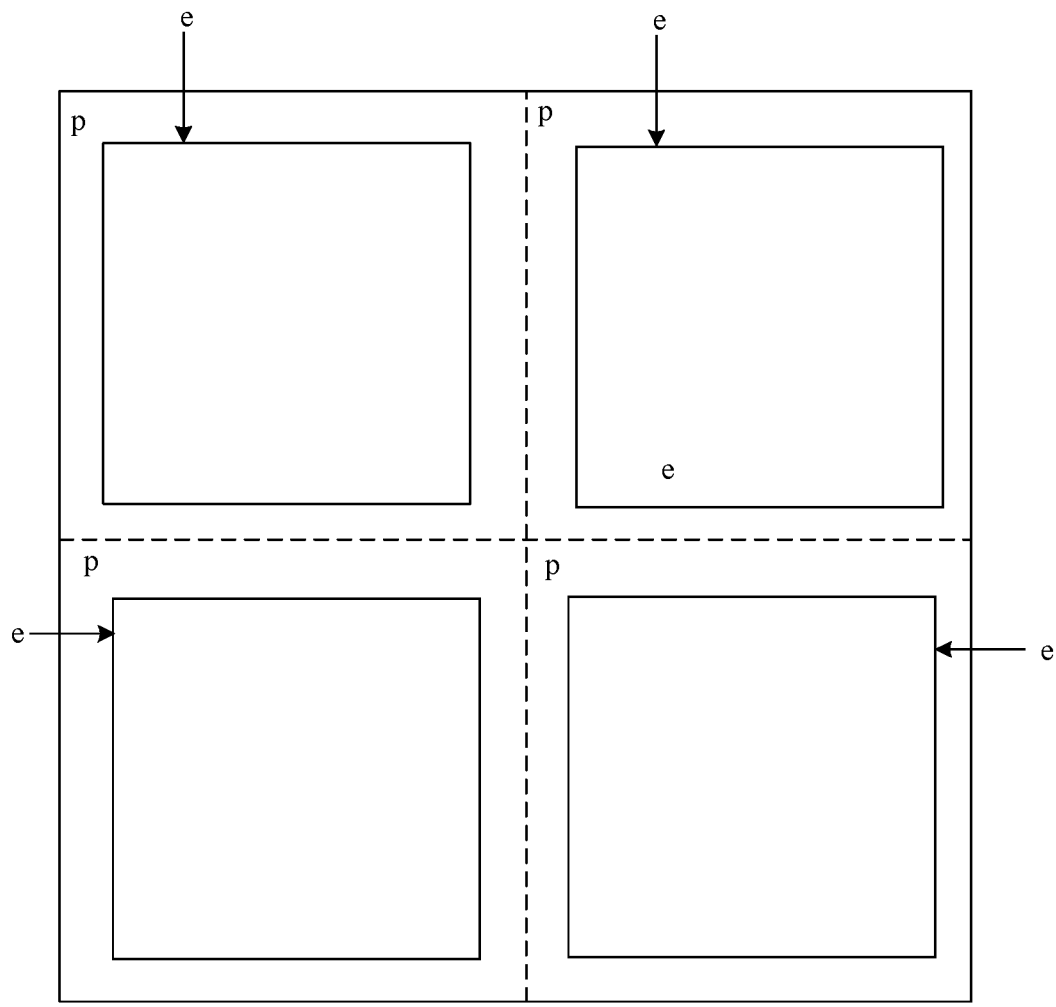
FIG. 7 is a schematic structural diagram of an electrode disposed in each of the sub-pixel regions in the display apparatus shown in FIG. 6.

The structure of the electrode disposed in each of the sub-pixel regions may be as shown in FIG. 7, and each of the sub-pixel regions p may have an electrode e (the electrode may be a first electrode, and/or, a grate-like electrode). When the grate-like structure includes the grate-like electrode disposed in each of the sub-pixel regions, the electrode e may include a grating pattern.

The material of the first sub-electrode 251 may include a transparent conductive material, such as indium tin oxide (ITO), or a metal (the metal also has a light-transmitting ability when it is extremely thin) such as Molybdenum (Mo).

The thickness of the first sub-electrode 251 may be determined according to the requirements of the applied voltage, such as 70 nm to 300 nm.

In another alternative implementation, the refractive index of the liquid crystal layer may be controlled jointly by a grate-like structure and an electrode structure which is disposed on the same side of the liquid crystal layer from the grate-like structure.

Figure 8:
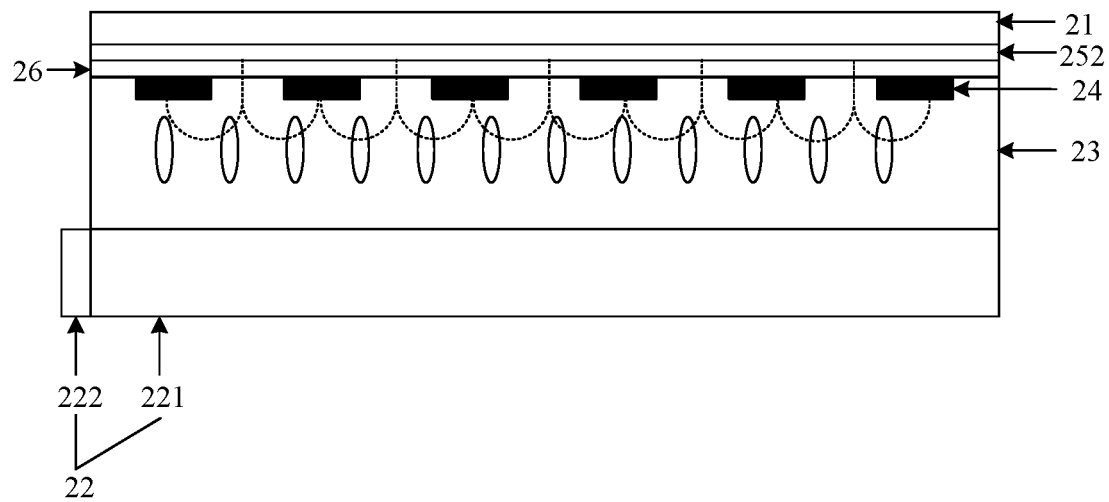
FIG. 8 is a schematic structural diagram of another display apparatus according to an embodiment of the present disclosure.

As shown in FIG. 8, the display apparatus further includes an electrode assembly 25. The electrode assembly 25 includes a second electrode structure 252 disposed between the light-transmitting substrate 21 and the grate-like structure 24. The grate-like structure 24 includes a grate-like electrode disposed in each of the sub-pixel regions. An insulating layer 26 is provided between the second electrode structure 252 and the grate-like structure 24. With such a structure, an arch-shaped electric field may also be formed between the grate-like structure 24 and the second electrode structure 252 to control the refractive index of the liquid crystal layer 23.

The transparent insulating layer 26 may prevent the first sub-electrode 251 from being short-circuited with the grate-like structure 24. The material of the transparent insulating layer 26 may include silicon nitride ($Si_3N_4$) or other insulating materials.

FIG. 8 illustrates a case where the grate-like structure 24 includes a grate-like electrode disposed in each of the sub-pixel regions and the first electrode structure 251 is an electrode layer. However, the first electrode structure 251 may, like the grate-like electrode, also include a first electrode disposed in each of the sub-pixel regions. The structure of the first electrode disposed in each of the sub-pixel regions may be as shown in FIG. 7, which is not described herein any further.

The material of the second sub-electrode 252 may include a transparent conductive material, such as indium tin oxide (ITO), or a metal such as molybdenum (Mo). The thickness of the second sub-electrode 252 may be determined according to the requirements of the applied voltage, such as 70 nm to 300 nm.

Optionally, the material of the liquid crystal layer 23 may include the liquid crystal material in an advanced super dimension switch (ADS) display panel (the ADS display panel may include an in-plane switching (IPS) display panel and a fringe field switching (FFS) display panel) or the liquid crystal material in a vertical alignment (VA) display panel, or may include blue phase liquid crystal (BP-LC) material (the BP-LC is a liquid crystal with the advantages of short response time, large viewing angle, and no need for an alignment layer) or other liquid crystals, which is not limited in the embodiment of the present disclosure. The thickness of the liquid crystal layer 23 may be about 1 micrometer, or may be several micrometers or several hundreds of nanometers.

Optionally, the material of the grate-like structure 24 includes a reflective conductive material. The grate-like structure 24 composed of the reflective conductive material may cause the reflected and diffracted light in the light emitted to the grate-like structure 24 to cancel each other. Since the reflected and diffracted light cancels each other, according to the law of conservation of energy, the transmitted and diffracted light passing through the grate-like structure 24 is enhanced. Therefore, the grate-like structure 24 composed of the reflective conductive material may have the effect of increasing the light transmittance of the grate-like structure.

Optionally, the grating period of the grate-like structure 24 (the grating period refers to the center distance between two dark stripes of the grating) may be 3 micrometers, and the duty ratio thereof (the duty ratio is the ratio of the bright stripe width to the entire cycle width in any period of the grating structure) is 0.5. When the grate-like structure 24 includes a plurality of grate-like electrodes, the grating period of the grate-like structure 24 may refer to a grating period of the grating pattern in each of the electrodes.

Optionally, the material of the light-transmitting substrate may include a substrate glass of a liquid crystal display panel, a substrate glass of an organic light emitting diode display panel, other optical glasses, resin, and the like.

Optionally, in the display apparatus according to the embodiment of the present disclosure, the collimated light source 222 may be a white light source or a monochromatic light source. When the collimated light source 222 is a monochromatic light source, it may be composed of a monochromatic semiconductor laser chip, or may be made of a monochromatic light emitting diode (LED) chip with high collimation. The light emitting direction of the collimated light source 222 and the extension direction of the light guide plate 221 (the extension direction is a direction parallel to any of the two larger surfaces of the light guide plate) form a certain angle, such that the light from the collimated light source 222 emitted into the light guide plate may be totally reflected in the light guide plate.

Optionally, the light guide plate 221 in the embodiment of the present disclosure may be composed of a transparent material having a high refractive index (e.g., greater than or equal to 1.52). Exemplarily, the light guide plate 221 may be a substrate glass of a liquid crystal display panel, a substrate glass of an organic light emitting diode display panel, other optical glasses, resin, and the like. The thickness of the light guide plate 221 may be 0.1 mm to 2 mm, and the flatness and parallelism thereof may be high.

Optionally, the display apparatus according to the embodiment of the present disclosure may further include a color filter substrate, and the color filter substrate may be disposed between the light-transmitting substrate and the grate-like structure or may be composed of the light-transmitting substrate, which will be respectively described below.

Figure 9:
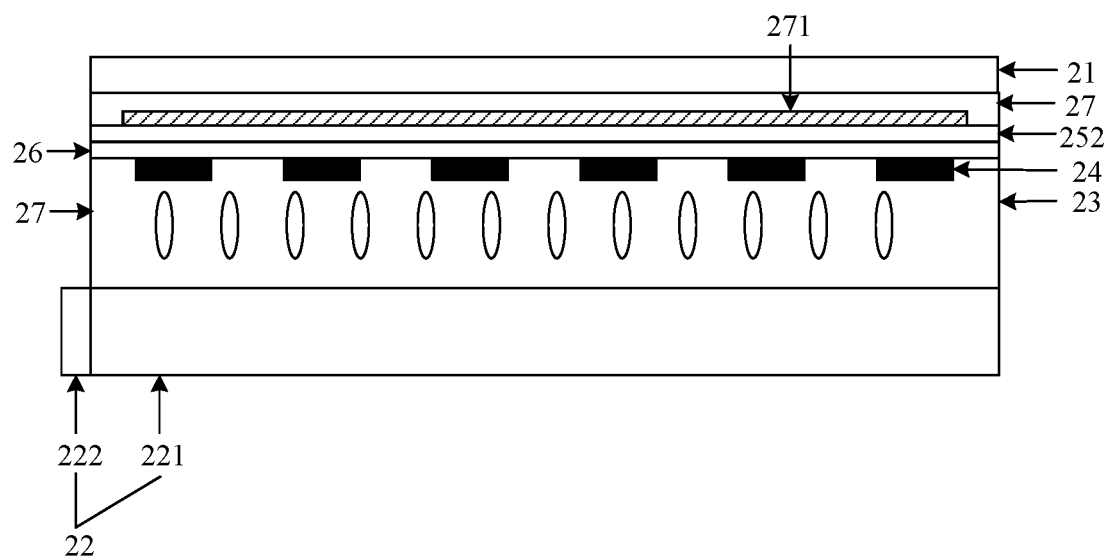
FIG. 9 is a schematic structural diagram of another display apparatus according to an embodiment of the present disclosure.

FIG. 9 illustrates a display apparatus in which the color filter substrate 27 is disposed between the light-transmitting substrate 21 and the grate-like structure 24. The color filter substrate 27 may include a color filter layer 271, and the color filter layer 271 may include a color filter one-to-one corresponding to each of the sub-pixel regions, such that the display apparatus may emit light of various colors.

For the structure of the display apparatus other than the color filter substrate 27, reference may be made to the display apparatus shown in the above embodiment, which is not described herein any further.

Figure 10:
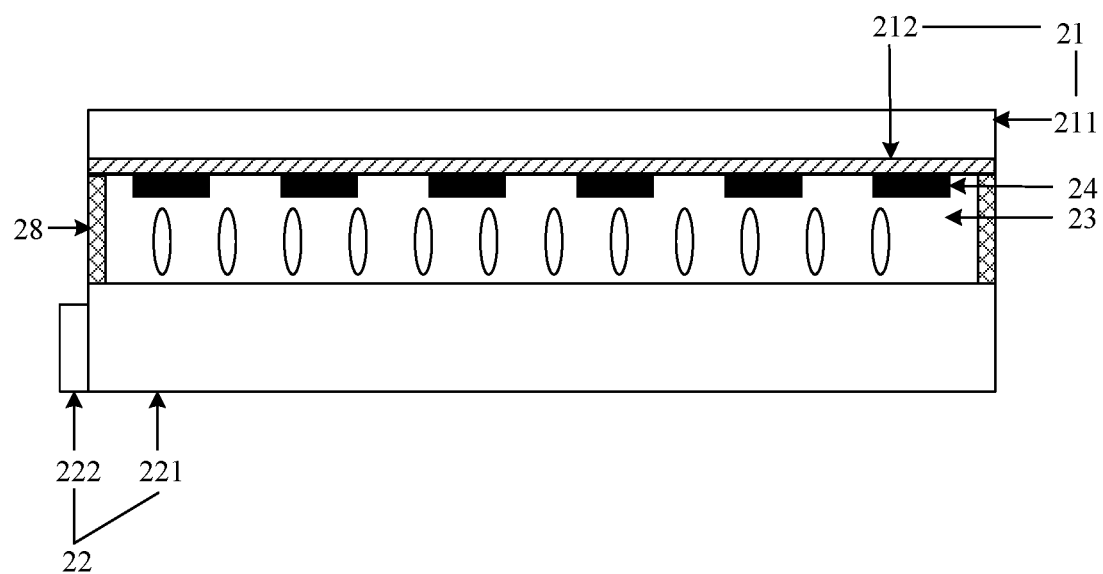
FIG. 10 is a schematic structural diagram of another display apparatus according to an embodiment of the present disclosure.

FIG. 10 illustrates a display apparatus in which the color filter substrate is composed of the light-transmitting substrate 21. The light-transmitting substrate 21 may include a transparent base substrate 211 and a color filter layer 212 which is disposed on the side of the transparent base substrate 211 close to the liquid crystal layer 23. The color filter layer 212 may include a color filter one-to-one corresponding to each of the sub-pixel regions, such that the display apparatus may emit light of various colors.

For the display apparatus shown in FIG. 9 and FIG. 10, when the collimated light source 222 in the backlight source 22 is a monochrome light source, if the display apparatus is not a monochrome display apparatus, the color filter substrate may be a quantum dot color filter (QD-CF) substrate.

The color filter layer in the quantum dot color filter substrate may be made of a quantum dot material, and the quantum dot material includes an inorganic semiconductor nanocrystal (that is, a quantum dot) having a particle size between 1 and 100 nanometers (nm). Since the quantum dot has a discrete energy level structure and a narrow spectral half-width, the color purity of the light emitted from the quantum dot is high after the quantum dot is illuminated by excitation light. In the embodiment of the present disclosure, the quantum dot material may be formed on the base substrate of the color filter substrate by means of inkjet or printing, so as to form the quantum dot color filter.

The monochromatic collimated light source may emit excitation light (such as blue light) that excites the quantum dots in the quantum dot material. For quantum dot light emission technology, high-energy excitation light may excite light with low energy. Exemplarily, blue light with high energy may excite red and green light with low energy. The quantum dots in the quantum dot material may emit light with high color purity after being illuminated by the excitation light, and the light with high purity may be used to improve the color gamut of a display panel, and may be used to increase the brightness of the display panel due to the high excitation efficiency of the quantum dots. Exemplarily, in FIG. 6, when the monochromatic collimated light source 222 is a blue light source, each of pixels in the quantum dot color filter substrate (i.e., the display substrate 21) may include a color filter layer R for exciting red light, a color filter layer G for exciting green light, and a transparent color filter layer B for transmitting blue light.

For the display apparatus shown in FIGS. 9 and 10, when the collimated light source 222 in the backlight source 22 is a white light source, the color filter substrate may be a conventional color filter substrate including various color filters.

Optionally, a sealant 28 may be further provided between two display substrates, and the sealant 28 is used to encapsulate the liquid crystal layer 23.

Optionally, in the display apparatus according to the embodiment of the present disclosure, the grate-like structure 24 satisfies a diffraction grating formula as follows.

$$n_i \sin \theta_i - n_d \sin \theta_d = m*\lambda/\Lambda (m=0,+/-1,+/-2,\ldots)$$

In the above formula, $n_i$ is an incident spatial refractive index, which may refer to the refractive index of the liquid crystal layer, $n_d$ is an emitting spatial refractive index, which may refer to the refractive index of the transparent insulating layer 26, $\theta_i$ is an incident angle of the light to the grating, $\theta_d$ is an emitting angle of the light from the grating, m is a grating order, $\lambda$ is a light wavelength, and $\Lambda$ is a grating period of the grating. The emitting spatial refractive index $n_d$ is a fixed value and the light wavelength $\lambda$ is known, in the case that the emitting spatial refractive index $n_d$ and the incident spatial refractive index $n_i$ are determined, the incident angle $\theta_i$ may be determined by simulation calculation (such as calculation by an optical simulation software) and therefore, the emitting angle $\theta_d$ may be adjusted by adjusting the grating period $\Lambda$ of the grating.

When the grate-like structure includes a grate-like electrode disposed in each of the sub-pixel regions, the grating pattern possessed by each grate-like electrode may satisfy the above-mentioned diffraction grating formula.

When the display apparatus according to the embodiment of the present disclosure is applied to a virtual reality (VR) or augmented reality (AR) device, the light emitting direction of a pixel on a certain position of the liquid crystal display panel may be determined according to the position of the pixel relative to the human eye. For example, the light emitting direction may be directed toward the center of the human eye. Therefore, the grating period $\Lambda$ of the grating may be adjusted, such that the emitting angle $\theta_d$ of the light emitted from the grating meets the requirements of the position of the pixel relative to the human eye for the light emitting direction.

Moreover, with respect to the display apparatus according to the embodiment of the present disclosure, the width of each sub-pixel may be equal to one or more grating periods according to the different brightness to be achieved by each pixel during design. Therefore, the size of the sub-pixel may be made small, thereby increasing the number of pixels per inch (PPI) in the display apparatus.

In summary, with respect to the display apparatus according to the embodiment of the present disclosure, the grate-like structure is provided on the side of the liquid crystal layer away from the light guide plate, and the grate-like structure is reused as both an electrode for controlling the refractive index of the liquid crystal and a grating, without separately providing electrode assemblies and a grating in the display apparatus. The problems that the structure of the display apparatus is relatively complicated and the light leakage occurs in the dark state are solved. The effects of simplifying the overall structure of the display apparatus and avoiding the light leakage in the dark state are achieved.

Figure 11:
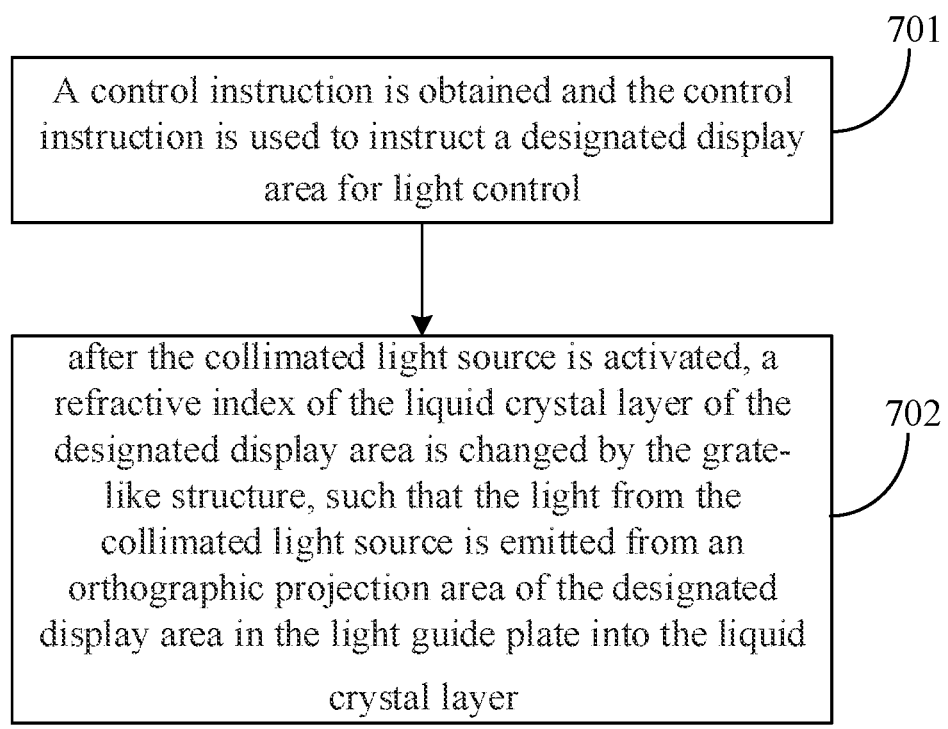
FIG. 11 is a flowchart of a control method of a display apparatus according to an embodiment of the present disclosure.

FIG. 11 is a flowchart of a control method of a display apparatus according to an embodiment of the present disclosure. The control method may be used by the controller in the display apparatus according to the above embodiment. The controller may be a processor or a control integrated circuit, the control method may include step 701 and step 702.

In step 701, a control instruction is obtained, and the control instruction is used to instruct a designated display area for light control.

The control instruction is an instruction for controlling the display apparatus to display, and the designated display area is an area where a portion of the image to be displayed by the display apparatus whose brightness is not 0 is disposed. The controller may obtain the control instruction from an external signal source.

Before step 701, the display apparatus may be activated, such that the collimated light source is activated.

In step 702, after the collimated light source is activated, a refractive index of the liquid crystal layer of the designated display area is changed by the grate-like structure, such that the light from the collimated light source is emitted from an orthographic projection area of the designated display area in the light guide plate into the liquid crystal layer.

In summary, with respect to the control method of the display apparatus according to the embodiment of the present disclosure, the grate-like structure is provided on the side of the liquid crystal layer away from the light guide plate, and the grate-like structure is reused as both an electrode for controlling the refractive index of the liquid crystal and a grating, without separately providing electrode assemblies and a grating in the display apparatus. The problems that the structure of the display apparatus is relatively complicated and the light leakage occurs in the dark state are solved. The effects of simplifying the overall structure of the display apparatus and avoiding the light leakage in the dark state are achieved.

The control method of the display apparatus may include control for a display gray scale of light emitting area and control for non-light emitting area in a display area of the display apparatus. In the embodiment of the present disclosure, the two control may be performed by an electrode assembly (including a first electrode structure or a second electrode structure) and a grating including strip electrodes arranged in an array.

Optionally, step 702 in the control method of the display apparatus shown in FIG. 11 may include sub-step 7021.

In sub-step 7021, the controller controls the deflection angle of the liquid crystal in the liquid crystal layer by the grate-like structure or by the grate-like structure and the electrode assembly to adjust the light emitting efficiency of the display apparatus.

For the structures of the grate-like structure and the electrode assembly, reference may be made to the above embodiments, which are not described herein any further.

The higher the light emitting efficiency of the display apparatus, the smaller the gray scale of the designated display area (i.e., the higher the brightness); and the lower the light emitting efficiency, the greater the gray scale of the designated display area (i.e., the lower the brightness).

Figure 12:
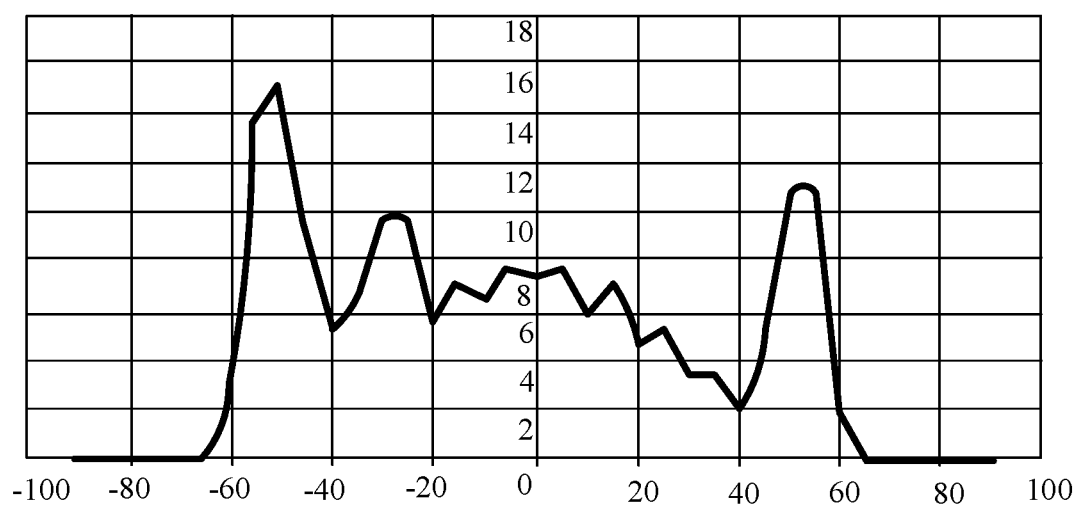
FIG. 12 is a graph showing a relationship between a deflection angle of the liquid crystal and a light emitting efficiency of the display apparatus in the embodiment shown in FIG. 11.

The relationship between the deflection angle of the liquid crystal and the light emitting efficiency of the display apparatus may be obtained through simulation testing by an optical simulation software. Exemplarily, when the incident angle of light in the light guide plate is 70°, the refractive index of the liquid crystal is 1.522 to 1.8, the thickness of the liquid crystal layer is 3 microns, and the grating period of the grating is 3 microns (μm). When the duty ratio of the grating is 0.5, a graph of the relationship between the deflection angle of the liquid crystal and the light emitting efficiency of the display apparatus may be as shown in FIG. 12. The horizontal axis is the deflection angle of the liquid crystal, and the vertical axis is the light emitting efficiency of the display apparatus (unit is %). The deflection angle of the liquid crystal may be adjusted according to the graph, and then the light emitting efficiency of the display apparatus may be adjusted.

The deflection angle of the liquid crystal is related to the refractive index thereof. When the deflection angle of the liquid crystal is changed, the refractive index of the liquid crystal will also be changed.

Optionally, after step 701 in the control method of the display apparatus shown in FIG. 1I is performed, the control for the non-light emitting area may be performed by the following two control modes.

The first control mode is: to control the deflection long axis of the liquid crystal in the liquid crystal layer of the display area excluding the designated display area in the display apparatus by the grate-like structure, such that the angle between the deflection long axis and the light guide plate is equal to the incidence angle of light in the light guide plate.

In this control method, the grate-like structure may be referenced to the display apparatus shown in FIG. 4 described above, which is not described herein any further.

The display area excluding the designated display area may be considered as the non-light emitting area. In some current display apparatuses, light leakage may occur in the non-light emitting area due to various reasons, which reduces the display effect of the display apparatus. In the embodiment of the present disclosure, when the angle between the deflection long axis of the liquid crystal in the liquid crystal layer and the light guide plate is equal to the incident angle of the light in the light guide plate, both the refractive index of the liquid crystal for ordinary light and the refractive index of the liquid crystal for extraordinary light are the smallest, and therefore, the light in the light guide plate will not be able to be emitted into the liquid crystal layer, thereby avoiding light from being emitted from the non-light emitting area, further avoiding the problem of light leakage in the dark state, and improving the display effect of the display apparatus.

The second control mode is; to control the deflection long axis of the liquid crystal in the liquid crystal layer of the display area excluding the designated display area in the display apparatus by the grate-like structure and the electrode assembly, such that the angle between the deflection long axis and the light guide plate is equal to the incidence angle of light in the light guide plate.

In this control mode, the grate-like structure and the electrode assembly may be referenced to the display apparatus shown in FIG. 6 or FIG. 8 described above, which are not described herein any further.

In summary, with respect to the control method of the display apparatus according to the embodiment of the present disclosure, the grate-like structure is provided on the side of the liquid crystal layer away from the light guide plate, and the grate-like structure is reused as both an electrode for controlling the refractive index of the liquid crystal and a grating, without separately providing electrode assemblies and a grating in the display apparatus. The problems that the structure of the display apparatus is relatively complicated and the light leakage occurs in the dark state are solved. The effects of simplifying the overall structure of the display apparatus and avoiding the light leakage in the dark state are achieved.

An embodiment of the present application further provides a display device. The display device includes the display apparatus according to the above embodiments.

Optionally, the display device is a virtual reality apparatus or an augmented reality apparatus. Since the display apparatus according to the embodiment of the present disclosure has a high transparency, the display apparatus may be applied to a virtual reality apparatus or an augmented reality device.

It should be noted that in the accompanying drawings, for clarity of the illustration, the dimension of the layers and regions may be scaled up. It may be understood that when an element or layer is described as being "above" another element or layer, the described element or layer may be directly on the other element or layer, or at least one intermediate layer may be arranged between the described element or layer and the other element or layer. In addition, it may be understood that when an element or layer is described as being "below" another element or layer, the described element or layer may be directly below the other element or layer, or at least one intermediate layer may be arranged between the described element or layer and the other element or layer. In addition, it may be further understood that when a layer or element is described as being arranged "between" two layers or elements, the described layer or element may be the only layer between the two layers or elements, or at least one intermediate layer or element may be arranged between the described element or layer and the two layers or elements. In the whole specification described above, like reference numerals denote like elements.

In the present disclosure, the terms "first" and "second" are used for descriptive purposes only and should not be construed to indicate or imply relative importance. The term "plurality" refers to two or more, unless explicitly defined otherwise.

The term "and/or" in the present disclosure just describes the correspondence of the corresponding objects, instructing three kinds of relationship. For example, A and/or B, may be expressed as: A exists alone, A and B exist concurrently, B exists alone. In addition, the character "/" in the present disclosure generally instructs that the context object is an "OR" relationship.

Persons of ordinary skill in the art may understand that all or part of the steps realizing the above embodiments may be performed through hardware, or through relevant hardware instructed by applications stored in a computer readable storage medium, such as a read-only memory, a disk, a CD, or the like.

Described are merely exemplary embodiments of the present disclosure, and are not intended to limit the present disclosure. Within the spirit and principles of the disclosure, any modifications, equivalent substitutions, or improvements are within the protection scope of the present disclosure.

What is claimed is:

1. A display apparatus, comprising a light-transmitting substrate, a backlight source, a liquid crystal layer, a grate-like structure, and a plurality of sub-pixel regions arranged in an array; wherein:
the liquid crystal layer is disposed between the light-transmitting substrate and the backlight source, and
the grate-like structure is disposed on a side of the light-transmitting substrate proximal to the liquid crystal layer and reused as a grating and an electrode configured to control an equivalent refractive index of the liquid crystal layer, wherein a material of the grate-like structure comprises a reflective and conductive material; and the grate-like structure comprises a plurality of grate-like electrodes, and each of the sub-pixel regions comprises at least two grate-like electrodes; and
the backlight source comprises a light guide plate and a collimated light source which is disposed on a side of the light guide plate other than two larger surfaces thereof.

2. The display apparatus according to claim 1,
wherein the display apparatus comprises an electrode assembly, and the electrode assembly comprises a first electrode structure disposed on a side of the liquid crystal layer proximal to the backlight source.

3. The display apparatus according to claim 2, wherein the first electrode structure comprises a plurality of first electrodes;
wherein the plurality of first electrodes are respectively disposed in each of the sub-pixel regions, and the grate-like structure covers on a side of the liquid crystal layer distal from the backlight source, and the grate-like structure is an integral structure.

4. The display apparatus according to claim 2,
wherein the plurality of grate-like electrodes are respectively disposed in each of the sub-pixel regions, and the first electrode structure is an electrode layer which covers the side of the liquid crystal layer proximal to the backlight source.

5. The display apparatus according to claim 2,
wherein the plurality of grate-like electrodes are respectively disposed in each of the sub-pixel regions, and the first electrode structure comprises a plurality of first electrodes, the plurality of first electrodes being respectively disposed in each of the sub-pixel regions.

6. The display apparatus according to claim 1, further comprising:
an electrode assembly, wherein the electrode assembly comprises a second electrode structure disposed between the light-transmitting substrate and the grate-like structure;
wherein the plurality of grate-like electrodes are respectively disposed in each of the sub-pixel regions, and the second electrode structure and the grate-like structure are insulated from each other.

7. The display apparatus according to claim 1, further comprising a color filter substrate, wherein the color filter substrate is disposed between the light-transmitting substrate and the grate-like structure.

8. The display apparatus according to claim 1, wherein the light-transmitting substrate is a color filter substrate, the color filter substrate comprising a transparent base substrate and a color filter layer which is disposed on a side of the transparent base substrate proximal to the liquid crystal layer.

9. The display apparatus according to claim 7, wherein the color filter substrate is a quantum dot color filter substrate.

10. The display apparatus according to claim 1, wherein the grate-like structure satisfies a diffraction grating formula, and the diffraction grating formula is:

$$n_i \sin \theta_i - n_d \sin \theta_d = m*\lambda/\Lambda (m=0,+/-1,+/-2,\ldots)$$

wherein $n_i$ is an incident spatial refractive index, $n_d$ is an emitting spatial refractive index, $\theta_i$ is an incident angle, $\theta_d$ is an emitting angle, m is a grating order, $\lambda$ is a light wavelength, and $\Lambda$ is a grating period of the grate-like structure.

11. The display apparatus according to claim 1, further comprising:
a second electrode structure disposed between the light-transmitting substrate and the grate-like structure;
wherein, the plurality of grate-like electrodes are respectively disposed in each of the sub-pixel regions, and the second electrode structure and the grate-like structure are insulated from each other;
the light-transmitting substrate is a color filter substrate, the color filter substrate comprising a transparent base substrate and a color filter layer which is disposed on a side of the transparent base substrate proximal to the liquid crystal layer, wherein the color filter substrate is a quantum dot color filter substrate; and
the grate-like structure satisfies a diffraction grating formula:

$$n_i \sin \theta_i - n_d \sin \theta_d = m*\lambda/\Lambda (m=0,+/-1,+/-2,\ldots)$$

wherein $n_i$ is an incident spatial refractive index, $n_d$ is an emitting spatial refractive index, $\theta_i$ is an incident angle, $\theta_d$ is an emitting angle, m is a grating order, $\lambda$ is a light wavelength, and $\Lambda$ is a grating period of the grate-like structure.

12. A control method of a display apparatus, applied to a display apparatus comprising a light-transmitting substrate, a backlight source, a liquid crystal layer, a grate-like structure, and a plurality of sub-pixel regions arranged in an array; wherein the liquid crystal layer is disposed between the light-transmitting substrate and the backlight source, and the grate-like structure is disposed on a side of the light-transmitting substrate proximal to the liquid crystal layer and reused as a grating and an electrode configured to control an equivalent refractive index of the liquid crystal layer, wherein a material of the grate-like structure comprises a reflective and conductive material; and the grate-like structure comprises a plurality of grate-like electrodes, and each of the sub-pixel regions comprises at least two grate-like electrodes; and the backlight source comprises a light guide plate and a collimated light source which is disposed on a side of the light guide plate other than two larger surfaces thereof;

the method comprising:

acquiring a control instruction, wherein the control instruction is configured to instruct a designated display area for light control in a display area of the display apparatus;

upon activation of a collimated light source, changing an equivalent refractive index of a liquid crystal layer of the designated display area by a grate-like structure, such that light from the collimated light source is emitted from an orthographic projection area of the designated display area in the light guide plate into the liquid crystal layer.

13. The control method according to claim 12, wherein the display apparatus comprises an electrode assembly, and upon the activation of the collimated light source, changing the equivalent refractive index of the liquid crystal layer of the designated display area by the grate-like structure, such that the light from the collimated light source is emitted from the orthographic projection area of the designated display area in the light guide plate into the liquid crystal layer comprises:

controlling a deflection angle of liquid crystal in the liquid crystal layer by the grate-like structure or by the grate-like structure and the electrode assembly to adjust a light emitting efficiency of the display apparatus.

14. The control method according to claim 12, wherein the display apparatus comprises an electrode assembly, and upon acquiring the control instruction, the method further comprises:

controlling a deflection long axis of the liquid crystal in the liquid crystal layer of the display area of the display apparatus other than the designated display area by the grate-like structure or by the grate-like structure and the electrode assembly, such that that an angle defined between the deflection long axis and the light guide plate is equal to an incident angle of the light in the light guide plate.

15. A display device, comprising a display apparatus, wherein the display apparatus comprises a light-transmitting substrate, a backlight source, a liquid crystal layer, a grate-like structure, and a plurality of sub-pixel regions arranged in an array; wherein the liquid crystal layer is disposed between the light-transmitting substrate and the backlight source, and the grate-like structure is disposed on a side of the light-transmitting substrate proximal to the liquid crystal layer and reused as a grating and an electrode configured to control an equivalent refractive index of the liquid crystal layer, wherein a material of the grate-like structure comprises a reflective and conductive material; and the grate-like structure comprises a plurality of grate-like electrodes, and each of the sub-pixel regions comprises at least two grate-like electrodes; and the backlight source comprises a light guide plate and a collimated light source which is disposed on a side of the light guide plate other than two larger surfaces thereof.

16. The display device according to claim 15, wherein the display device is a virtual reality device or an augmented reality device.

17. The display apparatus according to claim 8, wherein the color filter substrate is a quantum dot color filter substrate.

* * * * *